United States Patent
O'Brien et al.

(10) Patent No.: US 9,812,169 B2
(45) Date of Patent: Nov. 7, 2017

(54) OPERATIONAL SYSTEM AND ARCHITECTURAL MODEL FOR IMPROVED MANIPULATION OF VIDEO AND TIME MEDIA DATA FROM NETWORKED TIME-BASED MEDIA

(75) Inventors: Christopher J. O'Brien, Brooklyn, NY (US); Andrew Wason, Atlantic Highlands, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1983 days.

(21) Appl. No.: 12/294,722

(22) PCT Filed: Aug. 20, 2007

(86) PCT No.: PCT/US2007/076342
§ 371 (c)(1),
(2), (4) Date: Jun. 29, 2010

(87) PCT Pub. No.: WO2008/073538
PCT Pub. Date: Jun. 19, 2008

(65) Prior Publication Data
US 2010/0293466 A1    Nov. 18, 2010

Related U.S. Application Data

(63) Continuation-in-part of application No. PCT/US2007/076339, filed on Aug. 20, 2007, which
(Continued)

(51) Int. Cl.
*G06F 3/048* (2013.01)
*G11B 27/034* (2006.01)
(Continued)

(52) U.S. Cl.
CPC .......... *G11B 27/034* (2013.01); *G11B 27/322* (2013.01); *H04N 21/4825* (2013.01);
(Continued)

(58) Field of Classification Search
CPC ................................................. G06F 17/30017
(Continued)

(56) References Cited

U.S. PATENT DOCUMENTS 5,659,877 A    8/1997    Enomoto et al.
5,661,787 A    8/1997    Pocock
(Continued)

OTHER PUBLICATIONS

PCT/US07/76339, Filed Aug. 20, 2007, International Search Report and Written Opinion, 7 pages, dated May 27, 2008.
(Continued)

*Primary Examiner* — Andrey Belousov
(74) *Attorney, Agent, or Firm* — HP Inc. Patent Department (57) ABSTRACT

The present invention provides a novel operational system and electronic architectural model for organizing and improving viewing and editing of time-based video media and for overcoming the detriments required by the previous film and video industry based editing technologies. The present system enables an operator to manipulate the visual and audio perception of underlying video and audio data without changing the same. A series of metadata modules enable real-time operation and editing of video data and control of a play back module as well as an improved sharing, viewing, searching, and showing of underlying video and audio data.

20 Claims, 2 Drawing Sheets

Related U.S. Application Data is a continuation-in-part of application No. PCT/US2007/068042, filed on May 2, 2007, which is a continuation-in-part of application No. PCT/US2007/065534, filed on Mar. 29, 2007, which is a continuation-in-part of application No. PCT/US2007/065387, filed on Mar. 28, 2007, which is a continuation-in-part of application No. PCT/US2007/065391, filed on Mar. 28, 2007.

(60) Provisional application No. 60/822,925, filed on Aug. 18, 2006, provisional application No. 60/822,927, filed on Aug. 19, 2006, provisional application No. 60/746,193, filed on May 2, 2006, provisional application No. 60/787,393, filed on Mar. 29, 2006, provisional application No. 60/787,105, filed on Mar. 28, 2006, provisional application No. 60/787,069, filed on Mar. 28, 2006.

(51) Int. Cl.
*G11B 27/32* (2006.01)
*H04N 21/482* (2011.01)
*H04N 21/658* (2011.01)
*H04N 21/6587* (2011.01)
*H04N 21/84* (2011.01)
*H04N 21/47* (2011.01)

(52) U.S. Cl.
CPC ..... *H04N 21/6581* (2013.01); *H04N 21/6587* (2013.01); *H04N 21/84* (2013.01); *H04N 21/47* (2013.01)

(58) Field of Classification Search
USPC ....... 715/201, 205, 209, 723, 730, 731, 733, 715/741, 744, 745, 746, 747, 748, 751
See application file for complete search history.

(56) References Cited

U.S. PATENT DOCUMENTS

| | | |
|---|---|---|
| 5,721,827 A | 2/1998 | Logan et al. |
| 5,986,692 A | 11/1999 | Logan et al. |
| 6,006,241 A | 12/1999 | Purnaveja et al. |
| 6,075,576 A | 6/2000 | Tan et al. |
| 6,314,425 B1 | 11/2001 | Serbinis et al. |
| 6,839,059 B1 | 1/2005 | Anderson et al. |
| 6,931,451 B1 | 8/2005 | Logan et al. |
| 6,977,667 B1 | 12/2005 | Burke |
| 7,055,166 B1 | 5/2006 | Logan et al. |
| 7,065,709 B2 | 6/2006 | Ellis et al. |
| 7,111,009 B1 * | 9/2006 | Gupta et al. ............... 369/30.08 |
| 2002/0069218 A1 | 6/2002 | Sull et al. |
| 2002/0165913 A1 | 11/2002 | Tokuda et al. |
| 2003/0018609 A1 | 1/2003 | Phillips et al. |
| 2003/0225641 A1 | 12/2003 | Gritzmacher et al. |
| 2004/0019608 A1 | 1/2004 | Obrador et al. |
| 2004/0220926 A1 | 11/2004 | Lamkin et al. |
| 2005/0144305 A1 | 6/2005 | Fegan, II et al. |
| 2005/0286546 A1 | 12/2005 | Bassoli et al. |
| 2006/0129909 A1 * | 6/2006 | Butt et al. ................. 715/500.1 |
| 2006/0161838 A1 * | 7/2006 | Nydam et al. ................ 715/512 |
| 2008/0080392 A1 | 4/2008 | Walsh et al. |
| 2008/0092168 A1 | 4/2008 | Logan et al. |
| 2008/0141180 A1 | 6/2008 | Reed et al. |
| 2008/0141303 A1 | 6/2008 | Walker et al. |

OTHER PUBLICATIONS

PCT/US07/65387, Filed Mar. 28, 2007, International Search Report and Written Opinion, 12 pages, dated Jul. 1, 2008.
PCT/US07/65534, filed Mar. 29, 2007, International Search Report and Written Opinion, 9 pages, dated Jul. 16, 2008.
PCT/US07/65391, filed Mar. 28, 2007, International Search Report and Written Opinion, 12 pages, dated Jul. 8, 2008.
PCT/US07/76342, filed Aug. 20, 2007, International Search Report and Written Opinion, 7 pages, dated Mar. 21, 2008.
PCT/US07/68042, filed May 2, 2007, International Search Report and Written Opinion, 9 pages, dated Sep. 11, 2008.

* cited by examiner

OPERATIONAL SYSTEM AND ARCHITECTURAL MODEL FOR IMPROVED MANIPULATION OF VIDEO AND TIME MEDIA DATA FROM NETWORKED TIME-BASED MEDIA

CROSS REFERENCE TO RELATED APPLICATIONS

This application relates to and claims priority from the following applications, the entire contents of each of which are fully incorporated herein by reference: PCT/US07/076342 filed Aug. 20, 2007, which claims priority from U.S. Prov. App. 60/822927 filed Aug. 19, 2006 and U.S. Prov. App. 60/822,925 filed Aug. 18, 2006; PCT/US07/076342 is in turn a Continuation-in-Part of PCT/US07/68042 filed May 2, 2007 and a Continuation-in-Part of PCT/US07/76339 filed Aug. 20, 2007; PCT/US07/68042 in turn claims priority from U.S. Prov. App. 60/746,193 filed Mar. 29, 2006; U.S. Prov. App. 60/787,393 filed Mar. 29, 2006, U.S. Prov. App. 60/787,105 filed Mar. 28, 2006, U.S. Prov. App. 60/746,193 filed Mar. 29, 2006, U.S. Prov. App. 60/787,069 filed Mar. 28, 2006; PCT/US07/68042 is a Continuation-in-Part of PCT/US07/65534 filed Mar. 29, 2007, which is a Continuation-in-Part of PCT/US07/65391 filed Mar. 28, 2007, which is a Continuation-in-Part of PCT/US07/65387 filed Mar. 28, 2007.

BACKGROUND OF THE INVENTION

1. Field of the Invention

The present invention relates to an operational system and computer system architecture for improved manipulation of video and other time-based media and associated time-based metadata. More specifically, the present invention relates a system and architectural model for organizing a method for manipulating, editing and viewing video and other time-based media and associated time-based metadata and edits thereto without changing initially secured and underlying video data wherein a series of user interfaces, an underlying operative program module and a supportive data module are provided within a cohesive operating system.

2. Description of the Related Art

Consumers are shooting more and more personal video using camera phones, webcams, digital cameras, camcorders and other devices, but consumers are typically neither skilled videographers nor are they able or willing to learn complex, traditional video editing and processing tools like Apple iMovie or Windows Movie Maker. Nor are most users willing to watch most video "VCR-style", that is, in a steady steam of unedited, undirected, unlabeled video.

Thus consumers are being faced with a problem that will be exacerbated as both the number of videos shot and the length of those videos grows (supported by increased processing speeds, memory and bandwidth in end-user devices such as cell phones and digital cameras) while the usability of editing tools lags behind. The result will be more and longer video files whose usability will continue to be limited by the inability to locate, access, label, discuss and share granular subsegments of interest within the longer videos in an overall library of videos.

In the absence of editing tools for the videos, adding titles and comments to the videos as a whole does not adequately address the difficulties within the present technology as will become aware to those of skill in the art who recognize the technological challenges illustrated herein after reviewing the instant discussion. As an example of the challenges currently unmet within the present technology, there may be only three 15-second segments of interest scattered throughout a 10 minute long, unedited video. A special problem, recognizable by those of skill in the art, is that distinct viewers may find distinct 15-second intervals of interest.

The challenge faced by viewers is to find those few short segments of video which are of interest to them at that time without being required to scan through the many sections which are not of interest.

The reciprocal challenge is for users to help each other find those interesting segments of video. As evidenced by the broad popularity of chat rooms, blogs etc. viewers want a forum in which they can express their views about content to each other, that is, to make comments. Due to the time-based nature of the video, expressing interest levels, entering and tracking comments and/or tags or labels on subsegments in time of the video or other time-based media is a unique and previously unsolved problem. Based on the disclosure herein, those of skill in the art should recognize that such time-variant metadata has properties very different from non-time-variant metadata and will require substantially distinct mechanisms and systems to manipulate and manage it.

Additional challenges described in Applicant's incorporated references apply equally well here including especially:

a. the fact that video and accompanying audio is a time-dependent, four dimensional object which needs to be viewed, manipulated and managed by users on a two-dimensional screen when time is precious to the user who does not wish to watch entire, unedited videos (discussed in detail below with regard to the special complexities of digitally encoded video with synchronized audio (referred to as DEVSA data);

b. the wide diversity of capabilities of the user devices which users wish to use to watch such videos ranging from PCs to cell phones (as noted further below); and c. the need for any proposed solution to be able to be structured for ready adaptation and re-encodation to accommodate the rapidly changing capabilities of the end-user devices and of the networks which support them.

Those with skill in the art should recognize the more generic terminology "time-based media" which encompasses not only video with synchronized audio but also audio alone plus also a range of animated graphical media forms ranging from sequences of still images to what is commonly called 'cartoons'. All of these forms are addressed herein. The terms, video, time-based media, and digitally encoded video with synchronized audio (DEVSA) are used as terms of convenience within this application with the intention to encompass all examples of time-based media.

A further challenge is that video processing uses a lot of computer power and special hardware often not found on personal computers. Video processing also requires careful hardware and software configuration by the consumer. Consumers need ways to edit video without having to learn new skills, buy new software or hardware, become expert systems administrators or dedicate their computers to video processing for great lengths of time.

Consumers have been limited to editing and sharing video that they could actually get onto their computers, which requires the right kind of hardware to handle their own video and also requires physical movement of media and encoding if they wish to use video shot by another person or is taken from stock libraries.

When coupled with the special complexities of digitally encoded video with synchronized audio the requirements for special hardware, difficult processing and storage demands combine to reverse the common notion of using "free desktop MIPS and GBs" to relieve central servers. Unfortunately, for video review and editing the desktop is just is not enough for most users. The cell phone is certainly not enough, nor is the personal digital assistant (PDA). There is, therefore, a need for an improved system and architectural model for shared viewing and editing of time-based media.

Those with skill in the conventional arts will readily understand that the terms "video" and "time-based media" as used herein are terms of convenience and should be interpreted generally below to mean DEVSA including content in which the original content is graphical.

This application addresses a unique consumer and data model and other systems that involve manipulation of time-based media. As introduced above, those of skill in the art reviewing this application will understand that the detailed discussion below addresses novel methods of receiving, managing, storing, manipulating and delivering digitally encoded video with synchronized audio. (Conveniently referred to as "digitally encoded video with synchronized audio" (DEVSA)). Those of skill in the art will also recognize that a focus of the present application is, in parallel with the actions applied to the DEVSA, to provide a novel system architecture and data model to gather, analyze, process, store, distribute and present to users a variety of novel and useful forms of information (referred to as metadata) concerning that DEVSA which information is synchronized to the internal time of DEVSA and multiply linked to the users both as individuals and as groups (defined in a variety of ways) which information enables them to utilize the DEVSA in a range of novel and useful manners, all without changing the originally encoded DEVSA.

In order to understand the concepts provided by the present, and related inventions within the inventive family, those of skill in the art should understand that DEVSA data is fundamentally distinct from and much more complex than data of those types more commonly known to the public and processed by computers such as basic text, numbers, or even photographs, and as a result requires novel techniques and solutions to achieve commercially viable goals (as will be discussed more fully below).

Techniques (editing, revising, compaction, etc.) previously applied to these other forms of data types cannot be reasonably extended due to the complexity of the DEVSA data, and if commonly known forceful extensions are orchestrated, they would Be ineffective in meeting users' objectives and/or
Be economically infeasible for non-professional users and/or
Make the so-rendered DEVSA data effectively inoperable in a commercially realistic manner.

Therefore a person skilled in the art of text or photo processing cannot easily extend the techniques that person knows to DEVSA.

What is proposed for the present invention is a new architecture for managing, storing, manipulating, operating with and delivering, etc. DEVSA data and novel kinds of metadata associated with, linked to and, in many cases, synchronized with said DEVSA. As will be discussed herein the demonstrated state-of-the-art in DEVSA processing suffers from a variety of existing, fundamental challenges associated with known DEVSA data operations. The differences between DEVSA and other data types and the consequences thereof are discussed in the following paragraphs.

These challenges affect not only the ability to manipulate the DEVSA itself but also to manipulate associated metadata linked to the internals of the DEVSA. Hence those of skill in the art not only face the challenges associated with dealing with DEVSA but also face the challenges of new metadata forms such as deep tagging, synchronized commenting, visual browsing and social browsing as discussed herein and in Applicant's related applications.

This application does not address new techniques for digitally encoding video and/or audio or for decoding DEVSA. There is related art in this area that can provide a basic understanding of the same and those of skill in the electronic arts know these references. Those of skill in the art will understand however that more efficient encoding/decoding to save storage space and to reduce transmission costs only serves to greatly exacerbate the problems of operating on DEVSA and having to re-save revised DEVSA data at each step of an operation if the DEVSA must be decoded, modified and re-encoded to perform any of those operations and as such are in direct contrast to the teachings of the present invention.

A distinguishing point about video and, by extension, stored DEVSA is to emphasize that video or DEVSA represents an object with four dimensions: X, Y, A-audio, and T-time, whereas photos can be said to have only two dimensions (X, Y) and can be thought of as a single object that has two spatial dimensions but no time dimension.

With video or stored DEVSA, large numbers of pixels arranged in a fixed X-Y plane which vary smoothly with T (time) plus A (audio amplitude over time) also varies smoothly in time in synchrony with the video. For convenience this is often described as a sequence of "frames" (such as 24 frames per second). This is however a fundamentally arbitrary choice (number of "frames" and use of "frame" language) and is a settable parameter at encoding time. In reality the time variance of the pixel's change with time is limited only by the speed of the semiconductors that sense the light. The difficulty in dealing with mere two dimensional photo technology is therefore so fundamentally different as to have no bearing on the present discussion (even more lacking are text art solutions).

Before going further it is also important for those of skill in the art to understand the scale of these DEVSA data elements that sets them apart from text or photo data elements and why this scale is so extremely difficult to manage. As a first example, a 10 minute video at 24 "frames" per second would contain 14,400 frames. At 600× 800 pixel resolution, 480,000 pixels, one approaches 7 billion pixel representations.

When one adds in the fact that each pixel needs 10- to 20 bits to describe it and the need to simultaneously describe the audio track, there is a clear and an impressive need for an invention that addresses both the complexity of the data and the fact that the DEVSA represents not a fixed, single object rather a continuous stream of varying objects spread over time whose characteristics can change multiple times within a single video. To date no viable solutions have been provided which are accessible to the typical consumer, other than very basic functions such as storing pre-encoded video files, manipulating those as fixed files, and executing START and STOP play commands such as those on a video tape recorder.

While one might have imagined that photos and video offer similar technical challenges, the preceding discussion makes it clear again that the difficulties in dealing with mere two dimensional photos which are fixed in time are therefore so fundamentally different and less challenging as to have no bearing on the present discussion. The preceding sentence applies at least as strongly to the issue of metadata associated with DEVSA. A tag, comment, etc. on an object fixed in time such as a text document or a picture or a photo are well-understood objects (metadata in a broad sense) with clear properties. The available technology has made such things more accessible but has not really changed their nature from that of the printed word on paper: fixed comment tied to fixed object.

In this and Applicant's related applications an emphasis is placed on metadata including tags, comments, visual browsing and social browsing information which are synchronized to the internal time-line of the DEVSA including after the DEVSA has been "edited", all without changing the DEVSA.

By way of background information, some additional facts about DEVSA should be well understood by those of skill in the art; and these include:

a. Current decoding technology allows one to select any instant in time within a video and resolve a "snapshot" of that instant, in effect rendering a photo of that instant and to save that rendering in a separate file. As has been shown, for example in surveillance applications, this is a highly valuable technology but it completely fails to address the present needs.

b. It is not possible to take a "snapshot" of audio as it is perceived by a person. Those of skill in the electronic and audio-electronic arts recognize that audio data is a one dimensional data type: (amplitude versus time). It is only that as amplitude changes with time that it is perceivable by a person. Electronic equipment can measure that amplitude if desired for special reasons.

The present application and those related family applications apply to this understanding of DEVSA when the actual video and audio is compressed (as an illustration only) by factors of a thousand or more but remain nonetheless very large files. Due the complex encoding and encodation techniques employed, those files cannot be disrupted or manipulated without a severe risk to the inherent stability of the underlying video and audio content. This explains in part the importance of keeping metadata and DEVSA as separate, linked entities previously unknown in the art.

The conventional manner in which users edit digitized data, whether numbers, text, graphics, photos, or DEVSA, is to display that data in viewable form, make desired changes to that viewable data directly and then re-save the now-changed data in digitized form.

The phrase above, "make desired changes to that viewable data", could also be stated as "make desired changes to the manner in which that data is viewed" because what a user "views" changes because the data changes, which is the normative modality. In contrast to this position, the proposed invention changes the viewing of the data without changing the data itself. The distinction is material and fundamental.

In conventional data changes, where storage cost is not an issue to the user, the user can choose to save both the original and the changed version. Some sophisticated commercial software for text and number manipulation can remember a limited number of user-changes and, if requested, display and, if further requested, may undo prior changes.

As an illustrative example only, those of skill in the art should recognize the below comparison between DEVSA and other somewhat related data types.

The most common data type on computers (originally) was or involved numbers. This problem was well solved in the 1950s on computers and as a material example of this success one can buy a nice calculator today for $9.95 at a local non-specialty store. As another example, both Lotus® and now Excel® software systems now solve most data display problems on the desktop as far as numbers are concerned.

Today the most common data type on computers is text. Text is a one-dimensional array of data: a sequence of characters. That is, the characters have an X component (no Y or other component). All that matters is their sequence. The way in which the characters are displayed is the choice of the user. It could be on an 8×10 inch page, on a scroll, on a ticker-tape, in a circle or a spiral. The format, font type, font size, margins, etc. are all functions added after the fact easily because the text data type has only one dimension and places only one single logical demand on the programmer, that is, to keep the characters in the correct sequence.

More recently a somewhat more complex data type has become popular, photos or images. Photos have two dimensions: X and Y. A photo has a set of pixels arranged in a fixed X-Y plane and the relationship among those pixels does not change. Thus, those of skill in the art will recognize that the photo can be treated as a single object and manipulated accordingly.

While techniques have been developed to allow one to "edit" photos by cropping, brightening, changing tone, etc., those techniques require one to make a new data object, a new "photo" (a newly saved image), in order to store and/or retrieve this changed image. This changed image retains the same restrictions as the original: if one user wants to "edit" the image, the user needs to change the image and re-save it. It turns out that there is little "size", "space" or "time" penalty to that approach to photos because, compared to DEVSA, images are relatively small and fixed data objects.

In summary, DEVSA should be understood by those of skill in the art as a type of data with very different characteristics from data representing numbers, text, photos or other commonly found data types. Those differences and their impacts are fundamental to the present disclosure. As a consequence, an extension of ideas and techniques that have been applied to those other, substantially less complex data types have no corollary to those conceptions and solutions noted below. The present invention must be appreciated by those of skill in the art as providing a new manner of (and a new solution for) dealing with DEVSA type data that both overcomes the detriments of such data noted above and results in a substantial improvement demonstrated via the present system and architectural model.

The present invention also recognizes the earlier-discussed need for a system to manage and use DEVSA data in a variety of ways while providing extremely rapid response to user input without changing the underlying DEVSA data.

What is also needed by those of skill in the art is the need for a new manner of dealing with DEVSA that overcomes the challenges inherent in such data and enables immediate and timely response to both initial video and DEVSA data, and that DEVSA and time-based media data that is amended or updated on a continual or rapidly changing basis.

What is not appreciated by the related art is the fundamental data problem involving DEVSA and current systems for manipulating the same in a consumer responsive manner.

What is also not appreciated by the related art is the need for providing a data model that accommodates (effectively) all present modern needs involving high speed and high volume video data manipulation and usages.

Accordingly, there is a need for an improved system and architectural model for shared viewing and editing of time-based media without changing the underlying video media content and which additionally takes into account the time-variant nature of the incorporated metadata.

OBJECTS AND SUMMARY OF THE INVENTION

A desire of the present invention is to provide a response to the detriments noted above.

It is another desire of the present invention to provide an improved video operation system with improved user-interaction over the Internet.

Another desire of the present invention is to provide an improved system and data model for shared viewing and editing of a time-based media that has been encoded in a standard and recognized manner.

Another desire of the present invention is to provide a system, data model, and architecture that enables convenient insertion of comments and labels or "tags" which are synchronized with DEVSA as it extends through time.

What is additionally proposed for the present invention is a new way for managing, storing, manipulating, operating with and delivering, etc. DEVSA data stored in a recognized manner using playback decision tracking with metadata co-linked to particular DEVSA data.

Another proposal of the present invention is to provide a data system and operational model that enables generation and tracking of multiple and independent (hierarchical) layers of metadata that are stored in a manner linked with video data that affect the way the video is played back to a user at a specific time and place without changing the underlying stored video reference.

It is another desire of the present invention to propose a system and architectural model that tracks (with metadata and playback decision tracking) individual user preferences on how to view video.

Another desire of the present invention is to enable a system for tagging video data to identify a specific user, in a specific hierarchy, in a specific modality (soccer, kids, fun, location, family, etc) while enabling a sharable or defined group interaction.

Another desire of the present invention is to enable a operative system that determines playback decision lists (PDLs) and both enables their operation in real-time on-line viewing of DEVSA data and also enables sending the PDL logic to an end user device for execution on that local device to minimize total bit transfer at each viewing event thereby further minimizing response time.

The present invention relates to a novel operational system and electronic architectural model for organizing and improving viewing and editing of video or other time-based media and for overcoming the detriments required by the previous editing techniques utilized in the film and video industries. The present system enables an operator to manipulate the visual and audio perception of underlying video and audio data without changing the same. A series of metadata modules enable real-time operation and editing of video data and control of a play back module as well as an improved sharing, viewing, searching, and showing of underlying video and audio data.

According to one optional aspect of the present invention, there is provided an operational system for improving manipulation of video and time-based media, comprising, a means for receiving user uploaded video media in an operational environment, means for encoding and storing encoded video media in an initial state, means for uploading, encoding, and storing metadata and playback decision lists (PDLs) data relating to the video media, means for controlling at least one of a display control and a play control of the video media, and means for interacting with the encoded video media, whereby the means for interacting includes means for generating at least one of the metadata and the personal decision list and for storing the at least one in a storage medium.

The above and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Before going further, and in order to fully appreciate the major innovation described in this and the related applications, it is necessary to introduce a new enabling concept which is referred to as the Playback Decision List or hereafter "PDL." The PDL is a portion of metadata contained within a data model or operational system for manipulating related video data and for driving, for example, a flash player to play video data in a particular way without requiring a change in the underlying video data (DEVSA). This new concept of a PDL is best understood by considering its predecessor concepts that originated years ago in film production and are used today by expert film and video directors and editors.

The predecessor concept is an Edit Decision List or EDL. It is best described with reference to the production of motion picture. In such a production many scenes are filmed, often several times each, in a sequence that has no necessary relationship to the story line of the movie. Similarly, background music, special effects and other add-ons are produced and recorded or filmed independently. Each of those film and audio elements is carefully labeled and timed with master lists.

When these master lists are complete, the film's director and editor sit down, often for a period of months, and review each element while gradually writing down and creating and revising an EDL which is a very detailed list, second by second, of which film sequences will be spliced together in what sequence perhaps with audio added to make up the entire film. Additionally, each sequence may have internal edits required such as fade-in/out, zoom-in/out, brighten, raise audio level and so on. The end result is an EDL. Technicians use the EDL to, literally in the case of motion picture to cut and paste together the final product. Some clips are just cut and "left on the cutting room floor." Expert production of commercial video follows a very similar approach.

The fundamental point of an EDL is that one takes segments of film or video and audio and possibly other elements and links them together to create a new stream of film or video, audio, etc. The combining is done at the film or video level, often physically. The original elements very likely were cut, edited, cropped, faded in/out, or changed in some other manner and may no longer even exist in their original form.

This EDL technique has proven to be extremely effective in producing high quality film and video. It requires a substantial commitment of human effort, typically many staff hours per hour of final media and is immensely costly. It further requires that the media elements to be edited be kept in viewable/hearable form in order to be edited properly. Such an approach is economically impossible when dealing with large quantities of consumer produced video. The PDL concept introduced herein provides a fundamentally different way to obtain a similar end result. The final "quality" of the video will depend on the skill and talent of the editor nonetheless.

The PDL incorporates as metadata associated with the DEVSA all the edit commands, tags, commentary, permissions, etc. introduced by a user via a User Interface (as will be discussed). It is critical to recognize that multiple users may introduced edit commands, tags, commentary, permissions, etc. all related to the same DEVSA without changing the underlying video data. The User Interface and the structure of the PDL allow a single PDL to retrieve data from multiple DEVSA.

The result is that a user can define, for example, what is displayed as a series of clips from multiple original videos strung together into a "new" video without ever changing the original videos nor creating a new DEVSA file. Since multiple users can create PDLs against the same DEVSA files, the same body of original videos can be displayed in many different ways without the need to create new DEVSA files. These "new" videos can be played from a single or from multiple DEVSA files to a variety of end-user devices through the use of software and/or hardware decoders which are commercially available. For performance or economic reasons, copies or transcodings of certain DEVSA files may be created or new DEVSA files may be rendered from an edited segment, to better serve specific end-user devices without changing the design or implementation of the invention in a significant manner.

Since multiple types of playback mechanisms are likely to be needed such as one for PCs, one for cell phones and so on, the programming model will create a "master PDL" from which algorithms can create multiple variations of the PDL suitable for each of the variety of playback mechanisms as needed. The PDL executes as a set of instructions to the video player.

As discussed earlier, in certain cases it is advantageous to download an encoded file in a form suitable to a specific device type rather than stream a display in real time. In the "download" case, the system will create the file using the PDL and the DEVSA, re-encode it in the appropriate format, and then send that encoded file to the end-user device where it is stored until the user chooses to play it. This "download" case is primarily a change in the mode of delivery rather a fundamentally distinct methodology.

One crucial innovation introduced by proposed PDL is that it controls the way the DEVSA is played to any specific user at any specific Multiple PDLs can exist for each DEVSA file and any PDL can control multiple DEVSA files. It is a control list for the DEVSA player (flash player or other video player). All commands (edits, sequences, tags, comments, permissions, etc.) are executed at playback time while the underlying DEVSA does not change. This makes the PDL in stark contrast to an EDL which is a set of instructions to create a new DEVSA out of previously existing elements.

Figure 1:
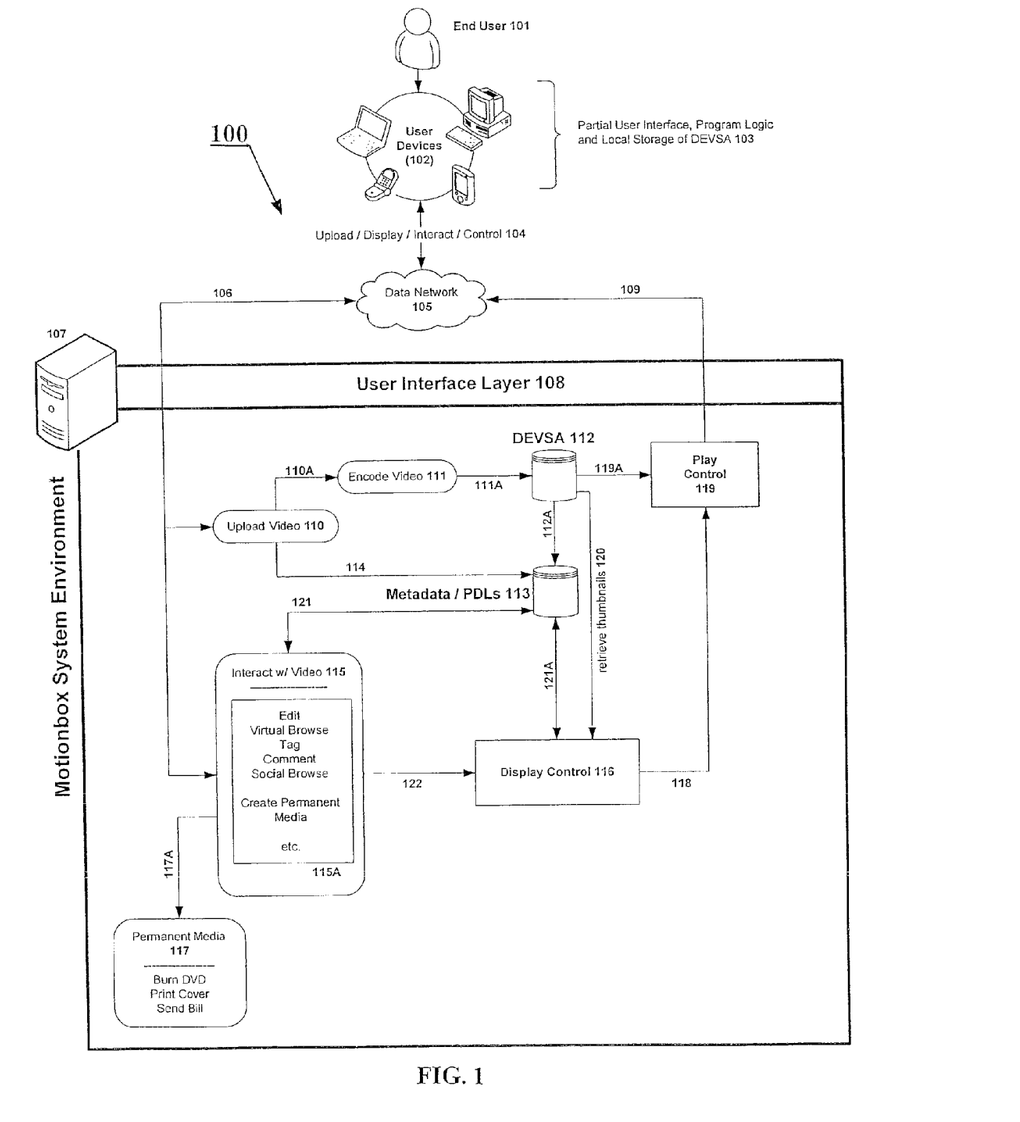
FIG. 1 represents an illustrative flow diagram for an operational system and architectural model for one aspect of the present invention.

Having completed the overall supporting discussion, reference is made now to FIG. 1, an architectural review of a system model 100 for improving manipulation and operations of video and time-based DEVSA data. It should be understood, that the term "video" is sometimes used below as a term of convenience and should be interpreted to mean DEVSA, or more broadly time-based media.

In viewing the technological architecture of system model 100, those of skill in the art will recognize that an end user 101 may employ a range of known user device types 102 (such as PCs, cell phones, PDAs, iPods, DVRs et al.) or combinations thereof to create and view DEVSA/video data. Diverse user device types can be used for distinct functions within the overall process described herein without constraint so long as the devices have the required functionality. For example, video may be captured on a camcorder, transferred to a PC from which it is uploaded to a Web site and then later viewed on a DVR or DVD player.

Devices 102 include a plurality of user interfaces, operational controls, video management requirements, programming logic, local data storage for diverse DEVSA formats, all represented via capabilities 103.

Capabilities 103 enable a user of a device 102 to perform multiple interaction activities 104 relative to a data network 105. These activities 104 are dependent upon the capacities 103 of devices 102, as well as the type of data network 105 (wireless, dial, DSL, secure, non-secure, etc.).

Activities 104 including upload, display, interact, control, etc. of video, audio and other data via some form of data network 105 suited to the user device in a manner known to those of skill in the art. The user's device 102, depending on the capabilities and interactions with the other components of the overall architecture system 100, will provide 103 portions of the user interface, program logic and local data storage.

Other functions are performed within the system environment represented at 107 which typically will operate on servers at central locations while allowing for certain functionality to be distributed through data network 105 as technology allows and performance and economy suggest without changing the architecture and processes as described herein.

All interactions between system environment 107 and users 101 pass through a user interface layer 108 which provides functionality commonly found on Internet or cell phone host sites such as security, interaction with Web browsers, messaging etc. and analogous functions for other end-user devices.

As discussed, the present system 100 enables user 101 to perform many functions, including uploading video/

DEVSA, audio and other info nation from his end-user device 102 via data network 105 into system environment 107 via a first data path 106.

First data path 106 enables an upload of DEVSA/video via program logic upload process loop 110. Upload process loop 110 manages the uploading process which can take a range of forms.

For example, in uploading video/DEVSA from a cell phone, the upload process 110 can be via emailing a file via interactions 104 and data network 105. In a second example, for video captured by a video camera, the video may be transferred from the camera to the user's PC (both user devices 102) and then uploaded from the PC to system environment 107 web site via the Internet in real time or as a background process or as a file transfer. Physical transmission of media is also possible.

During system operation, after a successful upload via uploading process loop 110, each video is associated with a particular user 101 and assigned a unique user and upload and video identifier, and passed via pathway 110A to an encode video process system 111 where it is encoded into one or more standard forms as determined by the system administrators or in response to a user request. The encoded video/DEVSA then passes via conduit 111A to storage in the DEVSA storage files 112. At this time, the uploaded, encoded and stored DEVSA data can be manipulated for additional and different display (as will be discussed), without underlying change. As will be more fully discussed below, the present data system 100 may display DEVSA in multiple ways employing a unique player decision list (PDL) for tracking edit commands as metadata without having to re-save, and re-revise, and otherwise modify the initially saved DEVSA.

Additionally, and as can be viewed from FIG. 1, during the upload (105-106-110), encodation (110A-111), and storage (111A-112) processes stages of system 100; a variety of "metadata" is created about the DEVSA including user ID, video ID, timing information, encoding information including the number and types of encodings, access information, and many other types of metadata, all of which passes via communication paths 114 and 112A to the metadata/PDL storage facility (ies) 113. There may be more than one metadata/PDL storage facility. As will be later discussed, the PDL drives the software controller for the video player on the user device via display control 116/play control 119 (as will be discussed).

Such metadata will be used repeatedly and in a variety of combinations with other information to manage and display the DEVSA combined with the metadata and other information to meet a range of user requirements. The present system also envisions a controlled capacity to re-encode a revised DEVSA video data set without departing from the scope and spirit of the present invention.

It is expected that many users and others including system administrators will upload (over time) many DEVSA to system environment 107 so that a large library of DEVSA (stored in storage 112) and associated metadata (stored in storage 113) will be created by the process described above.

Following the same data path 106 users can employ a variety of functions generally noted by interaction with video module 115. Several types of functionalities 115A are identified as examples within interact with video module 115; including editing, virtual browsing, commenting, social browsing, etc. Some of these functions are described in related applications. These functions include the user-controlled design and production of permanent DEVSA media such as DVDs and associated printing and billing actions 117 via a direct data pathway 117A, as noted. It should be noted that there is a direct data path between the DEVSA files 112 and the functions in 117 (not shown in the Figure for reasons of readability.)

Many of the other functions 115A are targeted at online and interactive display of video and other information via data networks. The functions 115 interact with users via communication path 106; and it should be recognized that functions 115A use, create, and store metadata 113 via path 121.

User displays are generated by the functions 115/115A via path 122 to a display control 116, which merges additional metadata via path 121A, thumbnails (still images derived from videos) from 112 via paths 120.

Thumbnail images are created during encoding process 111 and optionally as a real time process acting on the DEVSA without modifying the DEVSA triggered by one of the functions 115/115A (play, edit, comment, etc.).

Logically the thumbnails are part of the DEVSA, not part of the metadata, but they may be alternatively and adaptively stored as part of metadata in 113. An output of display control 116 passes via pathway 118 to play control 119 that merges the actual DEVSA from storage 112 via pathway 119A and sends the information to the data network 105 via pathway 109.

Since various end-user devices 102 have distinct requirements, multiple play control modules may easily be implemented in parallel to serve distinct device types. It is also envisioned, that distinct play control modules 119 may merge distinct DEVSA files of the same original video and audio with different encoding via 119A depending on the type of device being supported.

It is important to note that interactive functions 115/115A do not link directly to the DEVSA files stored at 112, only to the metadata/PDL files stored at 113. The display control function 116 links to the DEVSA files 112 only to retrieve still images. A major purpose of this architecture within system 100, is that the DEVSA, once encoded, is preferably not manipulated or changed—thereby avoiding the earlier noted concerns with repeated decoding, modifying, re-encoding and re-saving. All interactive capabilities are applied at the time of play control 119 as a read-only process on the DEVSA and transmitted back to user 110 via pathway 109.

Those of skill in the art will recognize that when a user creates a permanent media version 117, playback decision lists PDLs or play back decision preferences, evolve into edit decision lists (EDLs) or instructions that, along with other metadata such as deep tags and synchronized comments, become tables of contents, indices, section titles or other operative instructions on a fixed media version (DVD).

Those of skill in the art should recognize the common understanding that deep tags are metadata which are used to label and identify select portions of a video as desired and perhaps to allow the sequential generation of a video compilation, whereas an EDL or edit decision list may be used to create a new whole media out of a plurality of previously labeled or tagged pieces/snippets.

It should also be understood, that PDLs and EDLs are different in concept. EDLs are used to define how to encode/create/produce a new, distinct content, whereas PDLs move all decisions into the player to display a distinct content without changing the raw encoded content.

Figure 2:
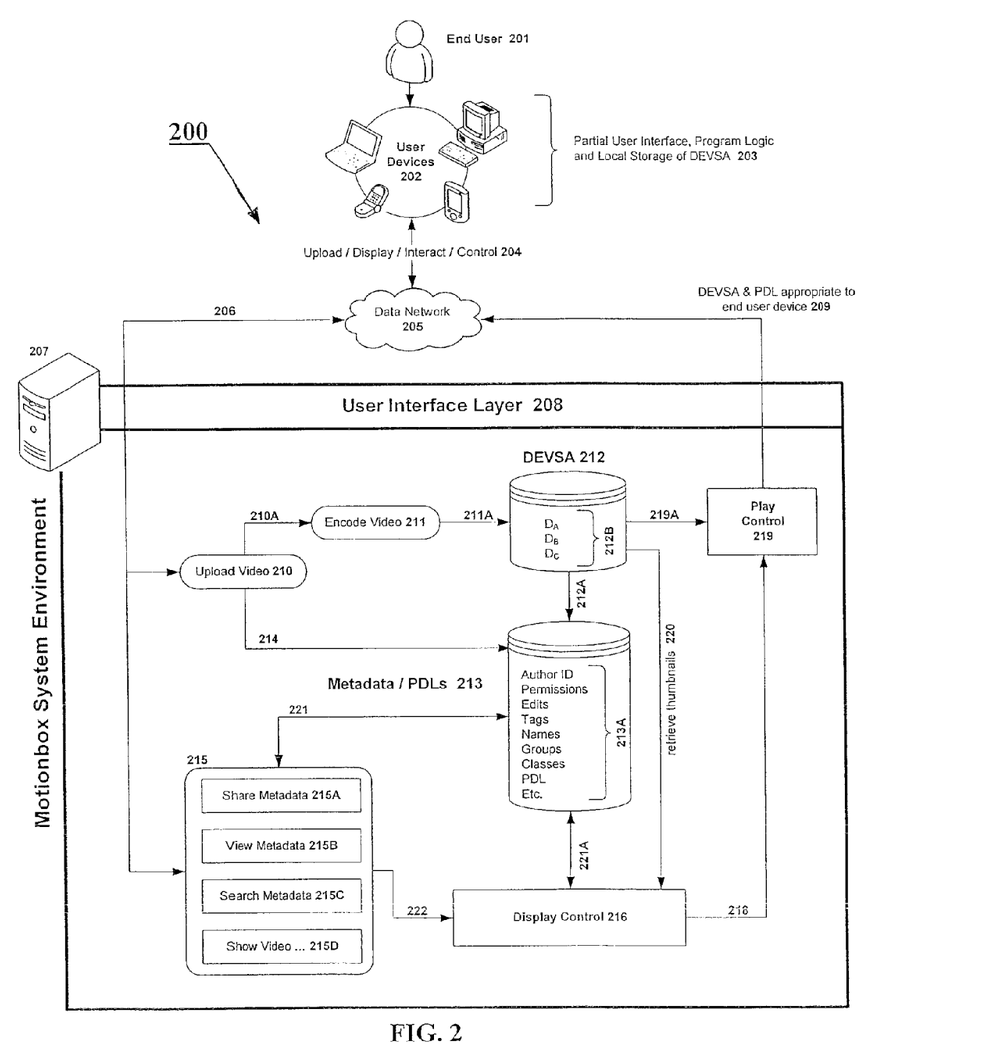
FIG. 2 represents an illustrative flow diagram of an interactive system and data model for shared viewing and editing of encoded video or other time-based media enabling a smooth interaction between a video media user and the underlying stored DEVSA data along with linked metadata.

Referring now to FIG. 2, in a manner similar to that discussed with FIG. 1, here an electronic system, integrated user interface, programming module and data model 200 describes the likely flows of information and control among various components noted therein. Again, as noted earlier, the term "video" is sometimes used below as a term of convenience and should be interpreted by those of skill in the art to mean DEVSA.

Here, an end-user 201 may optionally employ a range of user device types 202 such as PCs, cell phones, iPods, DVRs, et al. or combinations thereof which provide user 201 with the ability to perform multiple activities 204 including upload, display, interact, control, etc. of video, audio and other data via some form of a data network 205 suited to the particular user device 202.

User devices 202, depending on their capabilities and interactions with the other components of the overall architecture for proper functioning, will provide local 203 portions of the user interface, program logic and local data storage, etc., as will also be discussed.

Other functions are performed within the proposed system environment 207 which typically operates on one or more servers at central locations while allowing for certain functionality to be distributed through the data network as technology allows and performance and economy suggest without changing the program or data models and processes as described herein.

As shown, interactions between system environment 207 and users 201 pass through a user interface layer 208 which provides functionality commonly found on Internet or cell phone host sites such as security, interaction with Web browsers, messaging etc. and analogous functions for other end-user devices.

As noted earlier, users 201 may perform many functions; including video, audio and other data uploading DEVSA from user device 202 via data network 205 into system environment 207 via data path 206.

An upload video module 210 provides program logic that manages the upload process which can take a range of foam. For video from a cell phone, the upload process may be via emailing a file via user interface 208 and data network 205. For video captured by a video camera, the video can be transferred from a camera to a user's PC and then uploaded from the PC to system environment 207 via the Internet in real time or as a background process or as a file transfer. Physical transmission of media is also possible.

During operation of system 200, and after successful upload, each video is associated with a particular user 201, assigned a unique identifier, and other identifiers, and passed via path 210A to an encode video process module 211 where it is encoded into one or more standard DEVSA forms as determined by system administrators (not shown) or in response to a particular user's requests. The encoded video data then passes via pathway 211A to storage in DEVSA storage files 212.

Within DEVSA files in storage 212, multiple ways of encoding a particular video data stream are enabled; by way of example only, three distinct ways 212B, labeled $D_A$, $D_B$, $D_C$ are represented. There is no significance to the use of three as an example other than to illustrate that there are various forms of DEVSA encoding and to illustrate this diversity system 200 enables adaptation to any particular format desired by a user and/or specified by system administrators.

One or more of the multiple distinct methods of encoding may be chosen for a variety of reasons. Some examples are distinct encoding formats to support distinct kinds of end-user devices (e.g., cell phones vs. PCs), encoding to enhance performance for higher and lower speed data transmission, encoding to support larger or smaller display devices. Other rationales known for differing encodation forms are possible, and again would not affect the processes or system and model 200 described herein. A critical point is that the three DEVSA files 212B labeled $D_A$, $D_B$, $D_C$ are encodings of the same video and synchronized audio using differing encodation structures. As a result, it is possible to store multiple forms of the same DEVSA file in differing formats each with a single encodation process via encodation video 211.

Consequent to the upload, encode, store processes a plurality of metadata 213A is created about that particular DEVSA data stream being uploaded and encoded; including user ID, video ID, timing information, encoding information, including the number and types of encodings, access information etc. which passes by paths 214 and 212A respectively to the metadata/PDL (playback decision list) storage facilities 213. Such metadata will be used repeatedly and in a variety of combinations with other information to manage and display the DEVSA combined with the metadata and other information to meet a range of user requirements.

Thus, as with the earlier embodiment shown in FIG. 1, those of skill in the art will recognize that the present invention enables a single encodation (or more if desired) but many metadata details about how the encoded DEVSA media is to be displayed, managed, parsed and otherwise processed.

It is expected that many users and others including system administrators (not shown) will upload many videos to system environment 207 so that a large library of DEVSA and associated metadata will be created by the process described above.

Following the same data path 206, users 201 may employ a variety of program logic functions 215 which use, create, store, search, and interact with the metadata in a variety of ways a few of which are listed as examples including share metadata 215A, view metadata 215B, search metadata 215C, show video 215D etc. These data interactions utilize data path 221 to the metadata/PDL databases 213. A major functional portion of the metadata is Playback Decision Lists (PDLs) that are described in detail in other, parallel submissions, each incorporated fully by reference herein. PDLs, along with other metadata, control how the DEVSA is played back to users and may be employed in various settings.

As was shown in FIG. 1 many of the other functions in program logic box 215 are targeted at online and interactive display of video and other information via data networks. As was also shown in FIG. 1, but not indicated here, similar combinations of metadata and DEVSA can be used to create permanent media (DVD's, electronic memory tapes, electronic files stored on any medium of use known to those of skill in the art, etc.).

Thus, those of skill in the art will recognize that the present disclosure also enables a business method for operating a user interface 208.

It is the wide variety of metadata, including PDLs, created and then stored which controls the playback of video, not a manipulation of the underlying and encoded DEVSA data.

In general the metadata will not be dependent on the type of end-user device utilized for video upload or display although such dependence is not excluded from the present disclosure.

The metadata does not need to incorporate knowledge of the encoded DEVSA data other than its identifiers, its length in clock time, its particular encodings, knowledge of who is allowed to see it, edit it, comment on it, etc. No knowledge of the actual images or sounds contained within the DEVSA is required to be included in the metadata for these processes to work. While this point is of particular novelty, this enabling system 200 is more fully illustrative.

Such knowledge of the actual images or sounds contained within the DEVSA while not necessary for the operation of the current system enables enhanced functionalities. Those with skill in the art will recognize that such additional knowledge is readily obtained by means of techniques including voice recognition, image and face recognition as well as similar technologies. The new results of those technologies can provide additional knowledge that can then be integrated with the range of metadata discussed previously to provide enhanced information to users within the context of the present invention. The fact that this new form of information was derived from the contents of the encoded time-based media does not imply that the varied edit, playback and other media manipulation techniques discussed previously required any decoding and re-encoding of the DEVSA. Such knowledge of the internal contents of the encoded time-based media can be obtained by decoding with no need to re-encode the original video so the basic premises are not compromised.

User displays are generated by functions 215 via path 222 to display control 216 which merges additional metadata via path 221A, thumbnails (still images derived from videos) from DEVSA storage 212 via pathway 220. (Note that the thumbnail images are not part of the metadata but are derived directly from the DEVSA during the encoding process 211 and/or as a real time process acting on the DEVSA without modifying the DEVSA triggered by one of the functions 215 or by some other process.) Logically the thumbnails are part of the DEVSA, not part of the metadata stored at 213, but alternative physical storage arrangements are envisioned herein without departing from the scope and spirit of the present invention.

An output of display control 216 passes via pathways 218 to play controller 219, which merges the actual DEVSA from storage 212 via data path 219A and sends the information to the data network via 209. Since various end-user devices have distinct requirements, multiple play control modules may be implemented in parallel to serve distinct device types and enhance overall response to user requests for services.

Depending on the specific end-user device to receive the DEVSA, the data network it is to traverse and other potential decision factors such as the availability of remote storage, at playback time distinct play control modules will utilize distinct DEVSA such as files $D_A$, $D_B$ or $D_C$ via 219A.

The metadata transmitted from display control 216 via 218 to the play control 219 includes instructions to play control 219 regarding how it should actually play the stored DEVSA data and which encoding to use.

The following is a sample of a PDL—playback decision list—and a tracking of user decisions in metadata on how to display the DEVSA data. Note that two distinct videos (for example) are included here to be played as if they were one. A simple example of typical instructions might be:
Instruction (Exemplary):
Play video 174569, encoding b, time 23 to 47 seconds after start:
  Fade in for first 2 seconds—personal decision made for tracking as metadata on PDL.
  Increase contrast throughout—personal decision made for PDL.
  Fade out last 2 seconds—personal decision made for PDL.
Play video 174569, encoding b, time 96 to 144 seconds after start
  Fade in for first 2 seconds—personal decision made for PDL.
  Increase brightness throughout—personal decision made for PDL.
  Fade out last 2 seconds—personal decision made for PDL.
Play video 174573 (a different video), encoding b, time 45 to 74 seconds after start
  Fade in for first 2 seconds—personal decision for PDL.
  Enhance color AND reduce brightness throughout, personal decision for PDL.
  Fade out last 2 seconds—personal decision for PDL.

The playback decision list (PDLs) instructions are those selected using the program logic functions 215 by users who are typically, but not always, the originator of the video. Note that the videos may have been played "as one" and then have had applied changes (PDLs in metadata) to the visual video impression and unwanted video pieces eliminated. Nonetheless the encoded DEVSA has not been changed or overwritten, thereby minimizing risk of corruption, the expense of re-encoding has been avoided and a quick review and co-sharing of the same (or multiples of) video among multiple video editors and multiple video viewers has been enabled.

Much other data may be displayed to the user along with the DEVSA including metadata such as the name of the originator, the name of the video, the groups the user belongs to, the various categories the originator and others believe the video might fall into, comments made on the video as a whole or on just parts of the video, deep tags or labels on the video or parts of the video.

It is important to note that the interactive functions 215 for reviewing and using DEVSA data, do not link to the DEVSA files, only to the metadata files, it is the metadata files that back link to the DEVSA data. Thus, display control function 216 links to DEVSA files at 212 only to retrieve still images. A major purpose of this data architecture and data system 200 imagines that the DEVSA, once encoded via encodation module 211, is not manipulated or changed and hence speed and video quality are increased, computing and storage costs are reduced. All interactive capabilities are applied at the time of play control that is a read-only process on the DEVSA.

Those of skill in the art should recognize that in optional modes of the above invention each operative user may share their metadata with others, create new metadata or re-use previously stored metadata for a particular encoded video.

Those of skill in the art should also recognize that the use of the phrase media is employed as both a singular noun and sometimes a plural noun within a sentence construction, depending upon the construction itself. Those of skill in the art will recognize that the use of media as singular/plural is readily understood from the language construction local thereto.

Those of skill in the art will additionally recognize, that while the encoding system discussed herein is adaptively linked with the respective system and electronic interface, it will be recognized that each user electronic device necessarily operates with a respective encoding system to achieve the initial time-based media before transmitting the same. Therefore, an alternative embodiment of the present invention will recognize an adaptation wherein the encoding system may be provided additionally by or only by the user electronic device, without departing from the scope and spirit of the present invention.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A method of processing digitally encoded video with synchronized audio (DEVSA), comprising:
   receiving native-format DEVSA that defines a time-sequence rendering of the video and audio during playback;
   encoding the received DEVSA into at least one standard-format DEVSA;
   storing the encoded DEVSA in a DEVSA file;
   consequent to the receiving, encoding, and storing, creating from the DEVSA metadata usable to render the encoded DEVSA, the metadata stored in a metadata file separate from the at least one DEVSA file; and
   modifying the metadata file to define a different rendering of the encoded DEVSA during playback without modifying the DEVSA file, the different rendering specifying for playback at least one time segment of the time-sequence rendering.

2. The method of claim 1, comprising:
   streaming the encoded DEVSA, as specified by the modified metadata, to a user device capable of rendering DEVSA having the standard format.

3. The method of claim 1, wherein the creating automatically creates the metadata.

4. The method of claim 1, wherein the encoding encodes the received DEVSA into a plurality of DEVSA each having a different standard format.

5. The method of claim 4, wherein different ones of the plurality of standard-format DEVSA correspond to different end user device rendering capabilities, different data transmission speeds, or different size video displays.

6. The method of claim 1, wherein modifying the metadata includes generating at least one playback decision list comprising one or more of edit commands, tags, commentary, or permissions.

7. The method of claim 1, wherein the different rendering produces a different visual and audio perception of the encoded DEVSA during playback than the time-sequence rendering.

8. The method of claim 7, wherein the modified perception includes one or more of a modified video contrast, a modified video brightness, a modified video color, or a superimposed video transition effect.

9. The method of claim 1, comprising:
   decoding the encoded DEVSA to create thumbnail images or audio clips that are processable to further modify the metadata.

10. The method of claim 1, wherein the created metadata is independent of the native format of the DEVSA.

11. A digitally encoded video with synchronized audio (DEVSA) processing system, comprising:
    one or more servers;
    an upload module of at least one of the servers to receive native-format DEVSA that defines a time-sequence rendering of the video and audio during playback;
    an encoding module of at least one of the servers coupled to the upload stage to encode the native-format DEVSA into at least one standard-format DEVSA file stored in a file store; and
    a video module of at least one of the servers to interactively modify metadata stored separate from the at least one DEVSA file to produce a different rendering of the encoded DEVSA without modifying the encoded DEVSA file, the different rendering comprising at least one time segment of the time-sequence rendering specified to be played back.

12. The system of claim 11, wherein at least one of the upload module or the encoding module automatically creates, from the DEVSA, metadata usable to render the encoded DEVSA.

13. The system of claim 11, wherein the modified metadata that produce a different time-sequence rendering of the encoded DEVSA comprise a playback decision list.

14. The system of claim 13, comprising:
    a play controller to generate, responsive to the playback decision list, a DEVSA stream having the different rendering by processing the stored DEVSA in accordance with the playback decision list.

15. The system of claim 11,
    wherein the system is accessible over a network by a plurality of users, and
    wherein each user independently interacts with the video module to modify the metadata for a same DEVSA to generate a different playback decision list, each different playback decision list generating to the corresponding user a different time-sequence rendering of the encoded DEVSA without modifying the encoded DEVSA.

16. The system of claim 11,
    wherein the upload module receives a plurality of different native-format DEVSA, each of which the encoding module encodes into at least one standard-format DEVSA, and
    wherein a data stream generated by the system in accordance with a playback decision list of the modified metadata includes a different time-sequence rendering of the encoded DEVSA that corresponds to at least two of the different native-format DEVSA.

17. The method of claim 1, wherein the different rendering specifies a plurality of user-specified time segments of the time-sequence rendering for playback.

18. The method of claim 17, wherein the plurality of time segments are played back in a different order than in the time-sequence rendering.

19. The method of claim 17, wherein each time segment is a user-specified subset of the time-sequence rendering.

20. The system of claim 11, wherein the video module further interactively modifies at least one of a video contrast, video brightness, video color, or transition effect of the DEVSA.

* * * * *